(12) United States Patent
Galletti

(10) Patent No.: US 6,846,134 B1
(45) Date of Patent: Jan. 25, 2005

(54) ROTATING CONVEYOR FOR THE EVACUATION OF METAL SHAVINGS RESULTING FROM MACHINING OPERATIONS

(75) Inventor: Alfonso Galletti, Turin (IT)

(73) Assignee: GI. PI. SRL, Turin (IT)

( * ) Notice: Subject to any disclaimer, the term of this patent is extended or adjusted under 35 U.S.C. 154(b) by 0 days.

(21) Appl. No.: 10/763,161

(22) Filed: Jan. 26, 2004

(30) Foreign Application Priority Data

Jul. 31, 2003 (IT) ..................................... TO2003A0592

(51) Int. Cl.[7] .............................................. B65G 53/40
(52) U.S. Cl. ........................ 406/76; 406/141; 406/151; 406/152
(58) Field of Search ........................ 406/76, 141, 151, 406/152

(56) References Cited

U.S. PATENT DOCUMENTS

| 3,226,165 | A | * | 12/1965 | Karl-Heinz et al. | .......... 406/92 |
| 3,722,698 | A | * | 3/1973 | Hampton | ..................... 210/525 |
| 4,746,250 | A | * | 5/1988 | Schoppe | ....................... 406/63 |
| 5,932,094 | A | * | 8/1999 | Binder et al. | ................ 210/171 |
| 6,604,892 | B2 | * | 8/2003 | Binder | .......................... 406/80 |

* cited by examiner

Primary Examiner—Joe Dillon, Jr.
(74) Attorney, Agent, or Firm—Sughrue Mion, PLLC

(57) ABSTRACT

A rotating conveyor for the evacuation of metal shavings resulting from mechanical work processes, comprising a collecting container (2) in which a motorised basket (4) is rotating, above whose bottom wall (5) the lower end (12) of an evacuation conduit (11) connected to an aspiration unit is positioned. A blade stationary conveyor member (13), angularly adjustable, extends between the vertical axis of rotation (A) of the basket (4) and the lower end (12) of the evacuation conduit (11) to convey the shavings below it.

6 Claims, 4 Drawing Sheets

ROTATING CONVEYOR FOR THE EVACUATION OF METAL SHAVINGS RESULTING FROM MACHINING OPERATIONS

FIELD OF THE INVENTION

The present invention relates to a device for evacuating metal shavings resulting from machining processing plants by means of cutting machine tools. More in particular, the invention relates to a device for evacuating shavings of the rotating conveyor type, comprising a collecting container having an inlet opening for the entry of the shavings, a basket mounted to rotate in the collecting container about a vertical axis of rotation and having a bottom wall located underneath said inlet opening, motorised means for driving rotation of the basket, an evacuation conduit connected to an aspiration unit and having a lower end which terminates inside said collecting container above said bottom wall in offset position relative to the vertical axis of rotation of the basket, and a stationary conveyor member designed, during the rotation of the basket, to convey the shavings below the aforesaid lower end of the evacuation conduit.

STATE OF THE PRIOR ART

A rotating conveyor device of the kind described above is known from the German utility model DE-20304348U by the same Applicant. In this known solution, the conveyor member consists of a contour blade positioned immediately above the bottom wall of the basket between the axis of rotation thereof and the aforesaid lower end of the evacuation conduit. More in particular, the blade is fastened to the bottom end of the evacuation conduit and its location is fixed, i.e. it cannot be modified.

SUMMARY OF THE INVENTION

The present invention constitutes an enhancement of the known realisation of the aforesaid German utility model, and in particular its aim is to allow a practical and easy adaptation of the rotating conveyor to shavings with different characteristics, for instance in terms of shapes and dimensions.

According to the invention, this aim is achieved thanks to the fact that the aforesaid blade conveyor member is angularly adjustable.

The capability of angularly adjusting the blade conveyor member allows to vary its position relative to the lower end of the intake conduit, in such a way as to reduce or enlarge the port for the passage of the shavings towards said lower end of the intake conduit according to the specific characteristics of the shavings. This allows to optimise the action of evacuating the shavings from the collecting container, avoiding jams and more in general malfunctions.

According to a preferred embodiment of the invention, the blade conveyor member is borne by an end of a tubular support, coaxial to the aforesaid axis of rotation of the basket and having at the other end apart for the attachment to said container in different selectable positions.

BRIEF DESCRIPTION OF THE DRAWINGS

The invention shall now be described in detail with reference to the accompanying drawings, provided purely by way of non limiting example, in which.

DETAILED DESCRIPTION OF THE INVENTION

With reference to the drawings, the number 1 globally designates a rotating conveyor device for the pneumatic (or hydraulic) evacuation of metal shavings coming from cutting machine tools. The device 1 can advantageously be operatively associated to a self-fed triturating device of the type described and illustrated in European patent application EP-A-1151822 by the same Applicant.

Figure 1:
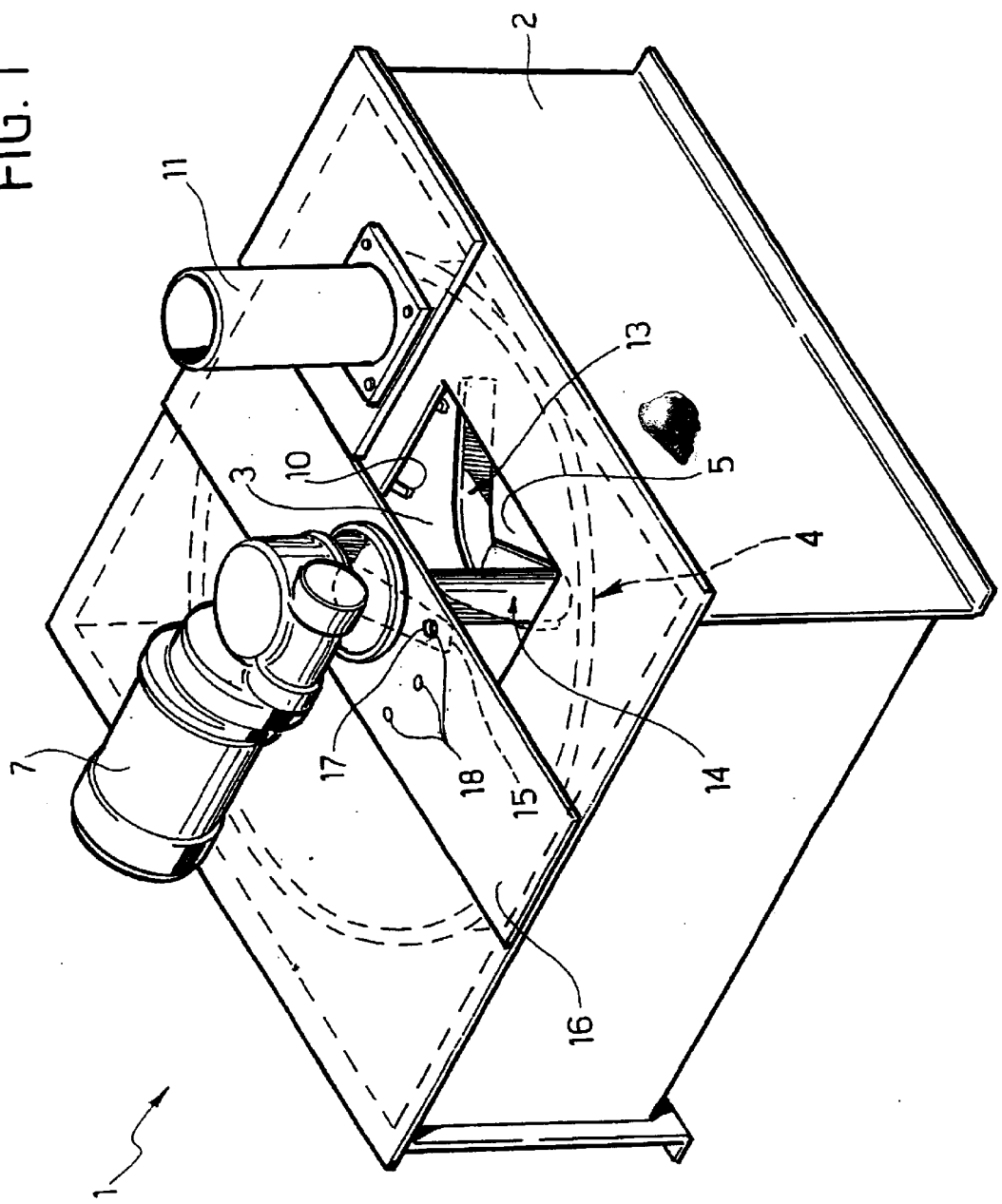
FIG. 1 is a schematic perspective view of a rotating conveyor device according to the invention.
Figure 2:
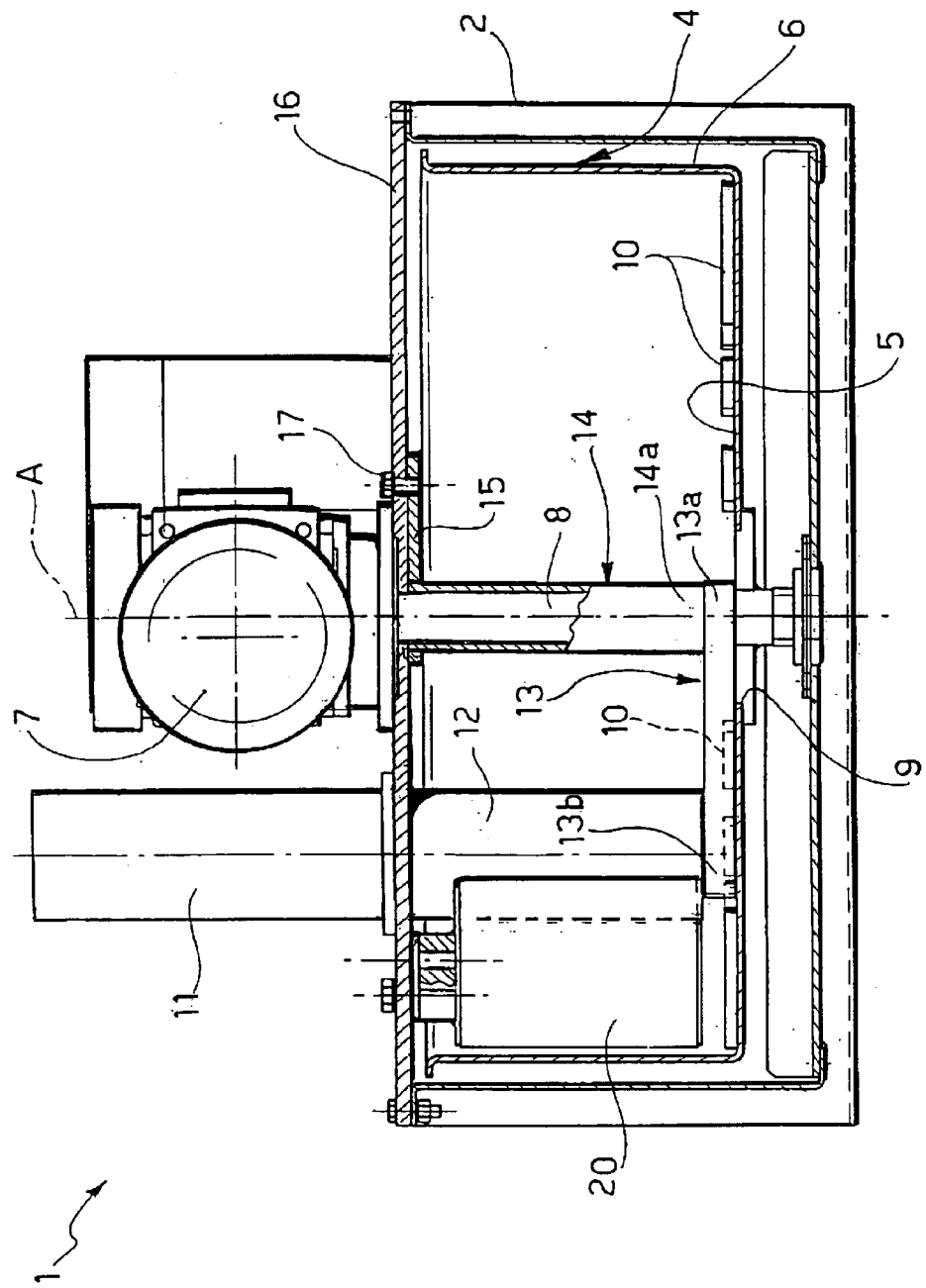
FIG. 2 is a partial vertical section view of FIG. 1.
Figure 3:
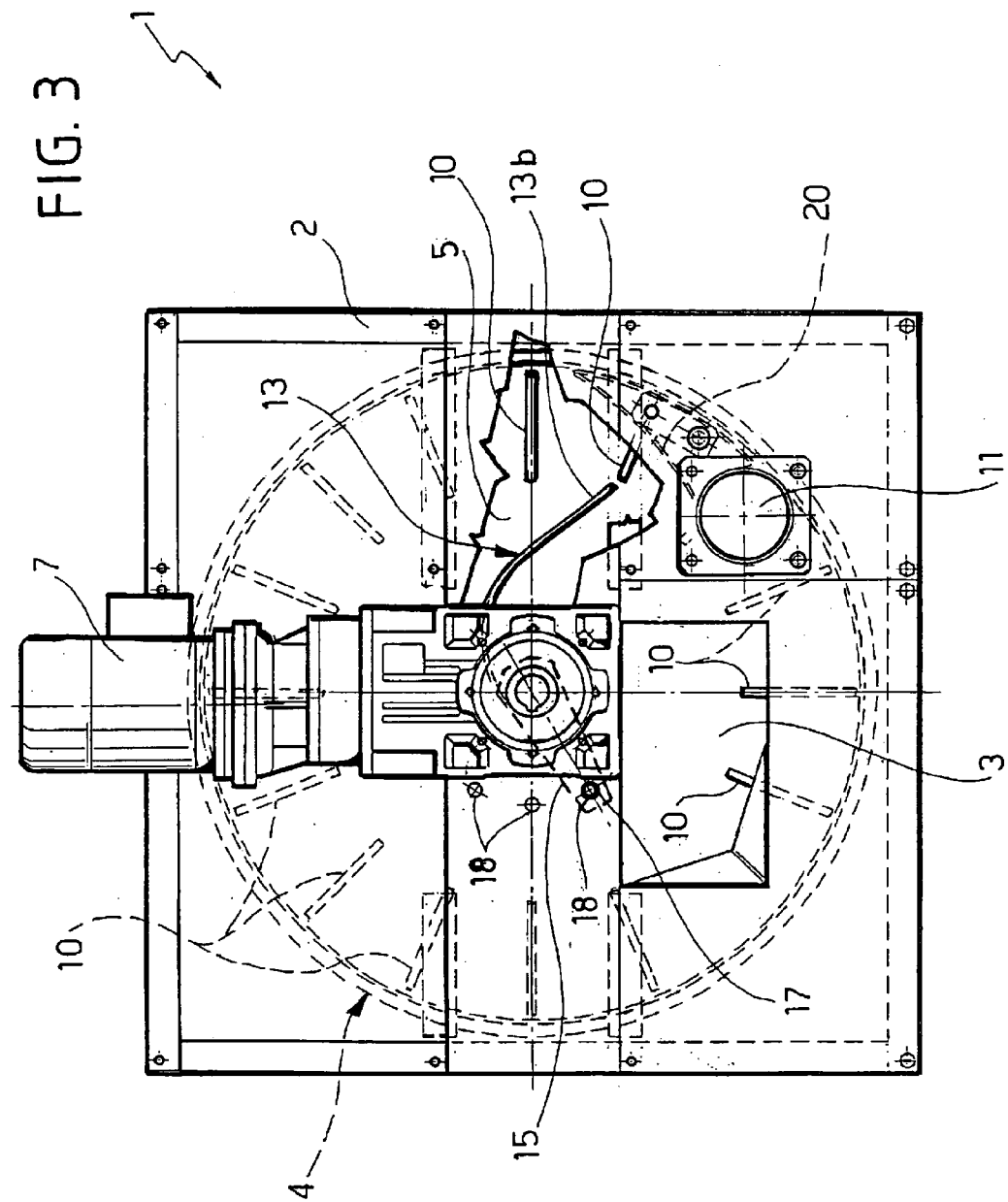
FIG. 3 is a top plan, partially broken view of FIG. 1.
Figure 4:
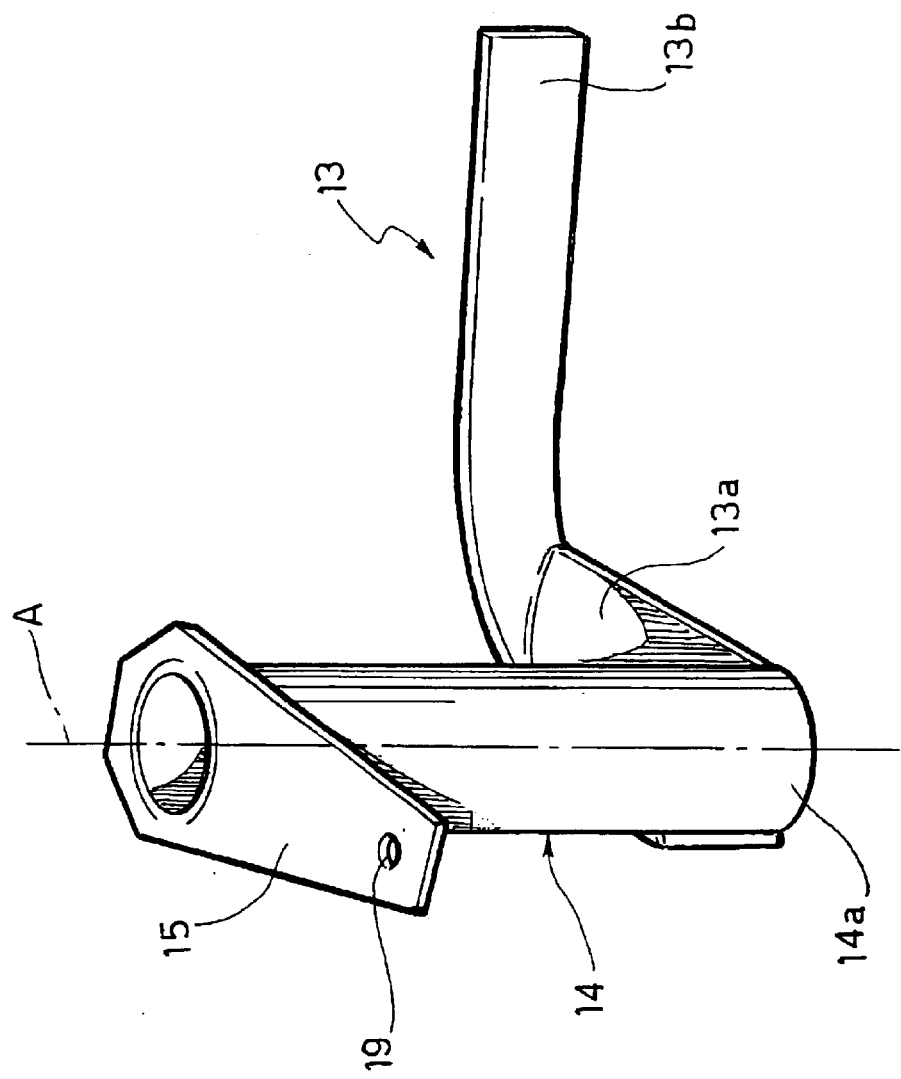
FIG. 4 is a perspective, enlarged scale view of a detail of the device.

The device 1 essentially comprises a collecting container 2, for instance of generally parallelepiped shape, having an upper opening 3 through which the triturated shavings are fed by gravity (or with different insertion system) to a basket 4 mounted able to rotate inside the collecting container 2 about a vertical axis A. The basket 4, which has a general cylindrical shape with a horizontal bottom wall 5 and lateral cladding 6 is commanded to rotate continuously, or in step or else intermittently, by means of a gear motor 7 fastened above the container 2. As FIG. 2 clearly shows, the gear motor 7 commands in rotation a vertical shaft 8, positioned along the axis A, which traverses the bottom wall 5 of the basket 4 and is torsionally coupled therewith in 9.

The bottom wall 5 of the basket 4 has a plurality of substantially radial projections 10 positioned starting from its periphery. Naturally, the number and the arrangement of the projections 10 may vary relative to what is described by way of example with reference to the figures.

The reference number 11 designates an evacuation conduit connected to a pneumatic (or hydraulic) intake unit, not shown herein, known to those versed in the art, advantageously through a pipeline or through a series of overhead pipelines. The evacuation conduit 11 extends vertically within the collecting container 2 and in an offset position relative to the vertical axis of rotation A of the basket 4. Said position substantially corresponds to the periphery of the bottom wall 5 bearing the radial projections 10.

The bottom end of the evacuation conduit 11, designated by the reference number 12, is positioned above the bottom wall 5 and it can have a bevelled edge.

The reference number 13 designates a stationary conveyor member constituted by a shaped blade positioned immediately above the bottom wall 5 of the basket 4 between the vertical axis A and the bottom end 12 of the evacuation conduit 11. The conveyor blade 13 has a general convex shape, with an attachment end 13a and a free end 13b. The attachment end 13a is rigidly fastened to the lower end 14a of a tubular support 14 which coaxially surrounds the vertical shaft 8 along the axis A. The upper end of the tubular support 14 has a radial flange 15 serving for its fastening to a support cross member 16 fastened above the container 2. Such fastening is achieved by means of one or more screws 17 capable of being selectively engaged in a series of holes 18 of the supporting cross member 16 and through a hole 19 of the flange 15 of the tubular support 14. In this way the angular position of the tubular support 14, and hence that of the conveyor blade 13, can be selectively varied. Said variation allows to position the free end 13b of the conveyor blade 13 at a greater or smaller distance from the lower end 12 of the evacuation conduit 11, in optimised fashion according to the characteristics of shape and dimensions of the shavings fed to the device.

The reference number 20 lastly designates a ploughshare shaped deflector fastened to the container 2 above the bottom wall 5 of the basket 4, between the end 13b of the conveyor blade 13 and the lower end 12 of the evacuation conduit 11. Said deflector 20 can be adjustable in height according to the characteristics of the shavings fed to the device.

In operation, the triturated shavings inserted into the collecting container 2 through the upper opening 3 are deposited on the bottom wall 5 of the basket 4. When the gear motor 7 is activated, the basket 4 is made to rotate clockwise with reference to the drawings, in such a way as to transfer the shavings towards the conveyor blade 13, thereby concentrating them underneath the lower end 12 of the evacuation conduit 11. The radial projections 10 act, during the rotation of the basket 4, in such a way as to move the shavings accumulated or concentrated by the blade 13 underneath the end 12 of the conduit 11, which is cyclically placed in communication with the aspiration unit to remove the shavings from the collecting container 2 and to transfer them to the overhead evacuation system.

It should be noted that the unit for aspirating the shavings can be either pneumatic or hydraulic. In this case, a hydraulic pump shall be positioned for example within the rotating the basket 4, and the shavings may be inserted into the collecting container 2 even without being preventively subjected to oil removal treatments.

Naturally, the construction details and the embodiments may be widely varied relative to what is described and illustrated herein, without thereby departing from the scope of the present invention, as defined in the claims that follow.

What is claimed is:

1. A rotating conveyor device for evacuating metallic shavings resulting from mechanical work processes, comprising a collecting container having an inlet opening for the entry of the shavings, a basket mounted to rotate in said collecting container about a vertical axis of rotation and having a bottom wall located below said inlet opening, motorised means for driving rotation of said basket, an evacuation conduit connected to a suction unit and having a lower end terminating inside said collecting container above said bottom wall of said basket in offset position relative to said vertical axis, and a stationary conveyor member designed, during the rotation of said basket, to convey the shavings underneath said lower end of said evacuation conduit, wherein said conveyor member comprises a shaped blade positioned immediately above the bottom wall of said basket between said vertical axis and said lower end of said evacuation conduit, and wherein said blade conveyor member is angularly adjustable.

2. A device as claimed in claim 1, wherein said blade conveyor member is born by an end of a tubular support, coaxial to said axis of rotation of said basket and having at the other end a part for attachment to said container in different selectable positions.

3. A device as claimed in claim 1, wherein said blade conveyor member has a generally convex shape.

4. A device as claimed in claim 1, wherein said bottom wall of said basket has a plurality of substantially radial peripheral projections.

5. A device as claimed in one claim 1, wherein a ploughshare shaped deflector co-operating with said blade conveyor member is operatively associated to said lower end of said evacuation conduit.

6. A device as claimed in claim 5, wherein said deflector is adjustable in height.

* * * * *